May 28, 1935. G. A. ROBERTSHAW 2,002,550
VALVE
Filed Sept. 17, 1926
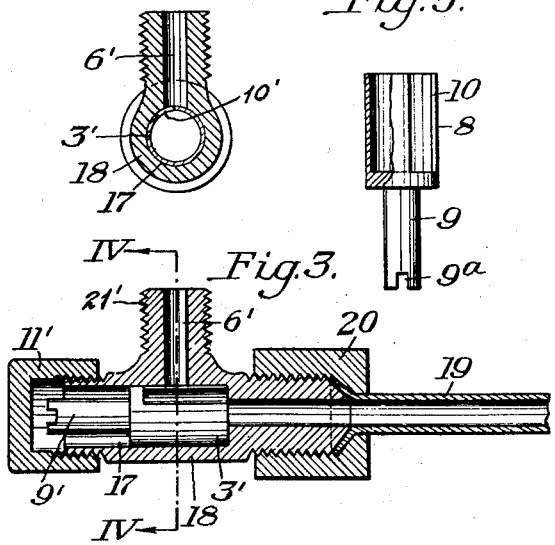
INVENTOR
George A. Robertshaw
by his attys.
Byrnes, Stebbins + Paumlee Patented May 28, 1935

2,002,550

UNITED STATES PATENT OFFICE 2,002,550

VALVE

George A. Robertshaw, Greensburg, Pa., assignor to Robertshaw Thermostat Company, Youngwood, Pa., a corporation of Pennsylvania Application September 17, 1926, Serial No. 136,039

5 Claims. (Cl. 158—120)

This invention relates to valves, and more particularly to a non-clogging valve adapted for the regulation of fluid flow at relatively low rates.

Heretofore, it has been customary to use needle valves to control low rates of fluid flow. It has also been proposed to tap a screw thread past the port or ports in a valve and control the flow therethrough by means of a screw movable across the port. The latter type of valve has been used frequently as a by-pass valve, and also as a control for pilot lights. Both of these types of valves, however, are open to the objections that they require a relatively accurately threaded screw portion, and that the valve aperture readily clogs with any small particles present in the valved fluid. Inasmuch as pilot lights consume a very small quantity of gas (ordinarily one half of a cubic foot to three cubic feet of gas per hour), frequent adjustment of such valves has been necessary to maintain the flow desired.

I obviate the foregoing difficulties of providing a valve having a yielding valve member engaging the body of the valve, and by providing a valve wherein the aperture has a relatively large area as compared with its perimeter. The aperture is preferably so shaped that it permits small particles to pass through the valve, although the valve may be adjusted to a very low rate of flow. The valve member is so constructed that it will adapt itself to slight changes in the size of the hole in which it fits. Such a member is desirable in that a deposit of foreign matter on the interior of the valve body will not cause the valve to stick or freeze if left in one position for some time.

Another object of my invention is the provision of a valve of simple and inexpensive design which does not depend upon an accurately threaded portion for close adjustment.

The foregoing and other advantages will become apparent by reference to the accompanying drawing, illustrating certain preferred embodiments of my invention, wherein Figure 1 illustrates my valve used as a by-pass for a thermostatically controlled valve;

Figure 2 is a sectional view of a valve for use in a line;

Figure 3 is a sectional view of a form of valve adapted to the control of pilot lights;

Figure 4 is a sectional view on the line IV—IV of Figure 3;

Figure 5 illustrates the type of valve plug shown in Figure 1;

Figure 6 illustrates a type of valve preferred for very small rates of flow; and Figures 7 and 8 are diagrammatic views showing the aperture formed.

In Figure 1 there is shown a valve 2 adapted to by-pass fluid around a thermostatically controlled valve T. The valve 2 comprises a valve plug 3 rotatably disposed in a cylindrical opening 4 within a body portion 5. The body portion 5 is provided with a conduit 6 adapted to be closed by the plug 3, and a conduit 7 which opens axially into the cylindrical opening 4.

The valve plug 3 preferably comprises a hollow cylindrical portion 8 (Figure 5) having an open end and a closed end. A control stem 9 extends axially from the closed end. The hollow cylindrical portion 8 is preferably formed with a thin wall which is cut to form an open slot 10 extending longitudinally of the plug. Depending upon the design of the valve body, one or more slots 10 may be provided, as shown in Figures 1 and 2 respectively. The material comprising the plug 3 is preferably of an elastic nature, so that the plug 3, when shaped and slotted, may be slightly larger than the cylindrical opening 4 into which it fits, thereby causing the spring compression of the plug to press the wall of the plug tightly against the body portion 5. The latter provision makes the valve fit tightly and, to a certain extent, holds the plug 3 in position. It will thus be seen that the valve plug 3 floats within the valve body, and is free to move longitudinally and to rotate except for the frictional engagement between the plug and the body.

Adjustment of the valve 2 may be had by engaging a screwdriver or like implement in a suitable slot 9a cut in the outer end of the control stem and rotating the same. A cap 11 threaded into the body portion 5 protects the valve plug 3 against accidental or unwarranted movement.

The conduit 6 is preferably such that it presents a substantially circular opening to the valve plug 3. The slot 10, extending longitudinally of the valve plug 3, will then uncover the opening in such manner that the clear passage will be substantially the segment of a circle. This is true for even the smallest opening, and the passage continues to be a segment until the leading edge of the slot 10 has passed across the mouth of the conduit 6. It will be understood that the perimeter of such an opening is very much less than the perimeter of the opening made by a needle valve. In the latter case, the opening is bounded by two concentric circles, and although the area of the opening may be adjusted to the same size to which my valve may be set, the surface "wetted" by the fluid while passing through the opening is very much greater than is the case in my valve. Furthermore, the opening presented by a needle valve is constricted to a narrow band between two concentric circles, while the opening presented by my valve is relatively wide in all directions, thereby permitting particles to pass freely through the valve.

Figure 2 illustrates a valve comprising a valve plug 3a rotatably secured within a body portion 12 by a spring 13. The spring 13 also acts to press suitable packing 14 against a stem 15 extending from the valve plug 3a. A cap 12a screwed into the body portion 12 bears against the packing 14 and compresses the spring 13. In this manner the valve plug 3a is held in a definite position within the body portion 12. It will be obvious to one skilled in the art that a similar spring may be employed with the valves illustrated in Figures 1 and 3, in which case a bias is imparted to the valve plug.

Suitable openings 16 form a passage through the body portion 12. These openings are uncovered by slots 10 in the valve plug 3a. Thus I provide a passage straight through the body portion 12 when the valve is opened.

The valve plug 3a, similarly to the plug 3, is preferably formed of yielding material and is slightly compressed within the body 12 so that the plug 3a tightly engages the body portion. In practice, I have found that a valve plug formed from brass rod gives good results.

In Figure 3, I have shown a valve adapted to control the flow of gas to a pilot light, although it will be apparent that other fluids may be valved with equal success. This valve comprises a valve plug 3', similar to the valve plug shown in Figure 1, fitting within a cylindrical opening 17 in a body portion 18. The body portion 18 is preferably T shaped, one end thereof being adapted to engage a tube 19 by means of a union nut 20. The opposite end may be closed by a cap 11' which protects the stem 9' of the valve plug 3'. Fluid may enter the valve through a passage 6' in a suitably threaded connection 21'. The passage 6' terminates in a substantially circular opening at its intersection with the cylindrical opening 17. The spring wall of the valve plug 3' effectively closes the mouth of the passage 6' until the slot 10' is turned to uncover the opening.

Figure 6 illustrates a valve plug 3b preferred for adjusting very small rates of flow. The plug 3b, like the valve members previously described, has a thin elastic wall adapted to press yieldingly against a confining valve body or casing. A slot 21 permits compression of the plug for insertion in a valve body. The leading edge 22 of the slot 21 is provided with a notch 23 adapted to cooperate with a port in a valve body. The notch 23 is preferably a V notch, and it is desirable to have the angle of the notch in the neighborhood of 60°. As shown in Figures 7 and 8, a 60° V notch cooperating with a large circular port provides a substantially equiangular triangular opening at extremely low rates of flow, and provides gradually increasing area as the valve is opened.

It will be understood, of course, that any suitable irregular contour may be given the leading edge of the slot without departing from the spirit of the invention. It will be further understood that the slot may be provided with notches or other irregular contour on both edges, thereby permitting operation of the valve in either right or left hand manner.

The provision of a thin wall on the valve plug is distinctly advantageous since the area of metal, encountered by the valved fluid in passing through the valve, is thereby rendered very small.

Thus I provide a valve capable of maintaining an accurate passage, such as is required for small pilot lights and by-pass flames upon the maintenance of which depends the safety of the heater or appliance used in conjunction herewith.

Further advantages accrue to my invention by reason of the provision of a valve wherein the aperture is of such shape that with even the smallest opening a free passage is provided for particles carried by the valved fluid.

I further provide an improved valve which will not stick or freeze if permitted to remain in one position for any length of time.

I also provide a simple inexpensive valve in which the valve plug adapts itself to changes in the opening with which it cooperates.

While I have illustrated and described certain present preferred embodiments of my invention with particular reference to the control of gas, it will be understood that the drawing does not define the limits of my invention, but that the invention may be otherwise embodied, and be employed with other fluids, without departing from the spirit of the invention or the scope of the following claims.

I claim:

1. In a pilot valve wherein the passage for the gas for the pilot flame is so small as to cause difficulty by the deposition of gum-like material when controlled by a needle valve, a body having a cylindrical bore, a hollow plug having one end closed and fitting tightly therein so as to be slidable axially thereof, a supply passage intersecting said bore, and an axial slot in said plug longer than the diameter of said passage, and means for limiting axial movement of said plug to preclude variation of the flow of fluid therethrough by such movement.

2. In a pilot valve wherein the passage for the gas from the pilot flame is so small as to cause difficulty by the deposition of gum-like material when controlled by a needle valve, a body portion having a cylindrical bore and having a side port communicating therewith, a corresponding cylindrical plug hollowed at one end and having a side port cooperating with the side port in said body portion, said side port in the plug extending as a slot to the extreme open end thereof, said slot terminating opposite the open end of the plug adjacent a head having a diameter substantially equal to the diameter of the slotted portion of the plug and adapted to engage with and seal said bore.

3. In a pilot valve wherein the passage for the gas for the pilot flame is so small as to cause difficulty by the deposition of gum-like material when controlled by a needle valve, the combination with a valve body having a cylindrical bore providing a seat of substantially constant cross sectional area throughout its length, and a fluid supply conduit communicating therewith, of a hollow cylindrical plug of substantially constant cross sectional area throughout the seating portion thereof fitting said bore tightly, said plug having one end closed and having the other end hollowed out, and having a port formed by an axially extending slot in the side wall of the hollowed out portion thereof, the slot extending through the open end portion of the plug, said plug being slidable axially in said bore and secured therein by a frictional fit, and means for limiting axial movement of the plug, said slot terminating opposite the open end of the plug adjacent a head having a diameter substantially equal to the diameter of the slotted portion of the plug and adapted to engage with and seal said bore.

4. A device of the character described wherein the passage for the gas for the pilot flame is so small as to cause difficulty by the deposition of gum-like material when controlled by a needle valve, said device comprising a body having an inlet opening adapted for connection to a gas supply and an outlet opening connected to the pilot or igniter flame, said body having a small passage establishing communication between said inlet and outlet openings, an apertured element movable for varying the effective size thereof and forming therewith a metering orifice having relatively small wall surfaces, the area of the cross section of the aperture in said element when in operative position being relatively larger in size than the area of said metering orifice.

5. A device of the character described wherein the passage for the gas for the pilot flame is so small as to cause difficulty by the deposition of gum-like material when controlled by a needle valve, said device comprising a body having an inlet opening adapted for connection to a gas supply and an outlet opening connected to the pilot or igniter flame, said body having a small passage establishing communication between said inlet and outlet openings, and a valve member mounted in said body and having a portion movable with respect to the walls defining said passage to provide a variable orifice, the portion of said valve member cooperating with said passage defining a metering orifice having relatively sharp edges and providing a concentrated opening for all adjustments of said valve.

GEORGE A. ROBERTSHAW.